United States Patent
Kim et al.

(10) Patent No.: US 9,411,164 B2
(45) Date of Patent: Aug. 9, 2016

(54) OPTICAL FILTER

(75) Inventors: Shin Young Kim, Daejeon (KR); Byoung Kun Jeon, Daejeon (KR); Moon Soo Park, Daejeon (KR); Da Mi Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 789 days.

(21) Appl. No.: 13/568,933

(22) Filed: Aug. 7, 2012

(65) Prior Publication Data
US 2015/0205142 A1    Jul. 23, 2015

(30) Foreign Application Priority Data

Aug. 9, 2011 (KR) .................... 10-2011-0078995
Aug. 6, 2012 (KR) .................... 10-2012-0085809

(51) Int. Cl.
| | | |
|---|---|---|
| *G02B 27/22* | (2006.01) | |
| *G02B 5/20* | (2006.01) | |
| *G02B 27/26* | (2006.01) | |
| *G02B 5/30* | (2006.01) | |
| *G02F 1/1334* | (2006.01) | |
| *G02F 1/1335* | (2006.01) | |
| *G02F 1/1337* | (2006.01) | |
| *G02F 1/13363* | (2006.01) | |

(52) U.S. Cl.
CPC .............. *G02B 27/22* (2013.01); *G02B 5/201* (2013.01); *G02B 5/3016* (2013.01); *G02B 5/3083* (2013.01); *G02B 27/2214* (2013.01); *G02B 27/26* (2013.01); *G02F 1/1334* (2013.01); *G02F 1/1337* (2013.01); *G02F 1/133512* (2013.01); *G02F 2001/133631* (2013.01); *G02F 2413/09* (2013.01)

(58) Field of Classification Search
CPC combination set(s) only.
See application file for complete search history.

(56) References Cited

U.S. PATENT DOCUMENTS

| | | | |
|---|---|---|---|
| 7,612,833 B2 | 11/2009 | Kim | |
| 8,687,132 B2 * | 4/2014 | Nakayama | ...................... 349/15 |
| 2004/0188653 A1 * | 9/2004 | Kataoka et al. | ........... 252/299.01 |
| 2004/0189909 A1 * | 9/2004 | Kashima | ........................ 349/117 |
| 2009/0225243 A1 * | 9/2009 | Kim et al. | ........................ 349/15 |
| 2011/0236681 A1 * | 9/2011 | Kim et al. | ..................... 428/343 |

FOREIGN PATENT DOCUMENTS

| | | | |
|---|---|---|---|
| JP | 2009-276664 | 11/2009 | |
| JP | 2010-072300 | 4/2010 | |
| JP | 2010-083781 | 4/2010 | |
| JP | 2010-164956 | 7/2010 | |
| JP | 4610678 B1 | 1/2011 | |
| JP | 2011-048286 A | 3/2011 | |
| JP | 2011048286 A | 3/2011 | |
| JP | 2013-029552 | 2/2013 | |
| KR | 10-0967899 | 7/2010 | |
| KR | 10-2010-0089782 | 8/2010 | |
| KR | 1020110086524 A | 7/2011 | |
| TW | 200706921 A | 2/2007 | |
| TW | 201037374 A | 10/2010 | |
| TW | 201140146 A | 11/2011 | |
| WO | WO 2011090355 A2 * | 7/2011 | ............. G02B 27/22 |
| WO | 2011-111094 | 9/2011 | |

* cited by examiner

*Primary Examiner* — Richard Kim
*Assistant Examiner* — Kendrick Hsu
(74) *Attorney, Agent, or Firm* — Dentons US LLP

(57) ABSTRACT

Provided is an optical filter and a display device. The illustrative optical filter may be applied to a stereoscopic image display device so that the stereoscopic image display device can display a 3D image at a wide viewing angle without loss of brightness.

15 Claims, 14 Drawing Sheets

FIG. 2

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

FIG. 12

| LS | RS | LS | RS | LS | RS | LS |
|----|----|----|----|----|----|----|
| RS | LS | RS | LS | RS | LS | RS |
| LS | RS | LS | RS | LS | RS | LS |
| RS | LS | RS | LS | RS | LS | RS |
| LS | RS | LS | RS | LS | RS | LS |
| RS | LS | RS | LS | RS | LS | RS |
| LS | RS | LS | RS | LS | RS | LS |
| RS | LS | RS | LS | RS | LS | RS |

OPTICAL FILTER

This application is a Utility Application which claims priority to and the benefit of Korean Patent Application Nos. 10-2011-0078995, filed on Aug. 9, 2011 and 10-2012-0085809, filed on Aug. 6, 2012, which are hereby incorporated by reference in their entirety herein.

BACKGROUND

1. Field

The present application relates to an optical filter and a display device.

2. Related Art

A technique of dividing light into at least two kinds of light having different polarized states may be available in various fields.

The light division technique may be applied in manufacturing a three-dimensional (3D) image. A 3D image may be realized using binocular disparity. For example, when two of two-dimensional images are respectively input to the left eye and the right eye of a human, input data is delivered to the brain and fused, and thus he/she experiences 3D perspective and reality. In such a process, the light division technique may be used.

A technique of generating a 3D image may be available in 3D measurement, a 3D TV, a camera or computer graphics.

Examples relating to stereoscopic image display devices to which the light division technique is applied are disclosed in Korean Patent No. 0967899 and Korean Patent Publication No. 2010-0089782.

Crosstalk phenomenon may become a problem in stereoscopic image display devices. The crosstalk phenomenon may occur when a signal to be incident to the left eye of an observer is incident to the right eye, or a signal to be incident to the right eye thereof is incident to the left eye. Due to the crosstalk phenomenon, a viewing angle may be reduced in observation of a 3D image. While various methods may be considered to prevent the crosstalk phenomenon, it is difficult to ensure a wide viewing angle by preventing the crosstalk phenomenon without loss of brightness of a 3D image.

SUMMARY

The present application is directed to providing an optical filter and a display device.

In one embodiment, an optical filter may include a liquid crystal layer. The liquid crystal layer may include first and second regions such that light incident to the optical filter may be divided into at least two kinds of light having different polarized states, and emitted. The first and second regions may be disposed adjacent to each other.

The liquid crystal layer may include a polymerizable liquid crystal compound. In one embodiment, the liquid crystal layer may include a polymerizable liquid crystal compound in a polymerized form. The term "polymerizable liquid crystal compound" may be a compound including a part exhibiting liquid crystallinity, for example, a mesogen backbone, and also including at least one polymerizable functional group. In addition, the phrase "including a polymerizable liquid crystal compound in a polymerized form" may refer to a state in which the liquid crystal compound is polymerized and thus a liquid crystal polymer is formed in the liquid crystal layer.

The liquid crystal layer may include a polymerizable liquid crystal compound in an un-polymerized state, or may further include a known additive such as a polymerizable non-liquid crystal compound, a stabilizer, an un-polymerizable non-liquid crystal compound or an initiator.

In one embodiment, the polymerizable liquid crystal compound included in the liquid crystal layer may include a multifunctional polymerizable liquid crystal compound and a monofunctional polymerizable liquid crystal compound.

The term "multifunctional polymerizable liquid crystal compound" may refer to a compound including at least two polymerizable functional groups in the liquid crystal compound. In one embodiment, the multifunctional polymerizable liquid crystal compound may include 2 to 10, 2 to 8, 2 to 6, 2 to 5, 2 to 4, 2 to 3, or 2 polymerizable functional groups. In addition, the term "monofunctional polymerizable liquid crystal compound" may refer to a compound including one polymerizable functional group in the liquid crystal compound.

When the multifunctional and monofunctional polymerizable compounds are used together, phase retardation characteristics of the liquid crystal layer may be effectively controlled, and realized phase retardation characteristics, for example, an optical axis of a phase retardation layer, or a phase retardation value may be stably maintained. The term "optical axis" used herein may refer to a slow axis or a fast axis when light is transmitted through a corresponding region.

The liquid crystal layer may include the monofunctional polymerizable liquid crystal compound at more than 0 to less than 100 parts by weight, 1 to 90 parts by weight, 1 to 80 parts by weight, 1 to 70 parts by weight, 1 to 60 parts by weight, 1 to 50 parts by weight, 1 to 30 parts by weight or 1 to 20 parts by weight, based on 100 parts by weight of the multifunctional polymerizable liquid crystal compound.

In the above-mentioned range, a mixing effect of the multifunctional and monofunctional polymerizable liquid crystal compounds may be maximized, and the liquid crystal layer may have excellent adhesive properties to an adhesive layer. Unless particularly defined otherwise, the unit "parts by weight" used herein may refer to a weight ratio.

The liquid crystal layer may satisfy the condition of General Expression 1.

$$X<8\%$$ [General Expression 1]

In Expression 1, X is a percentage of the absolute value of a change in value of phase difference after the liquid crystal layer is left at 80° C. for 100 or 250 hours, based on initial phase difference of the liquid crystal layer.

X may be calculated by "$100\times(|R_0-R_1|)/R_0$." Here, $R_0$ is a value of the initial phase difference of the liquid crystal layer, and $R_1$ is phase difference after the liquid crystal layer is left at 80° C. for 100 or 250 hours. X may be 7%, 6%, or 5% or less.

In one embodiment, the multifunctional or monofunctional polymerizable liquid crystal compound may be a compound represented by Formula 1.

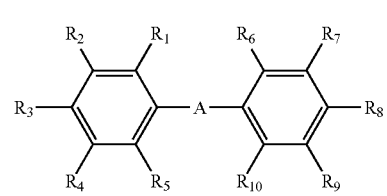

[Formula 1]

In Formula 1, A is a single bond, —COO— or —OCO—, $R_1$ to $R_{10}$ are each independently hydrogen, halogen, an alkyl group, an alkoxy group, an alkoxycarbonyl group, a cyano group, a nitro group, —O-Q-P or a substituent of Formula 2, or a pair of adjacent substituents among $R_1$ to $R_5$ or a pair of adjacent substituents among $R_6$ to $R_{10}$ form a benzene ring substituted with —O-Q-P by being connected to each other, with the proviso that at least one of $R_1$ to $R_{10}$ is —O-Q-P or a substituent of Formula 2, or a pair of adjacent substituents among $R_1$ to $R_5$ or a pair of adjacent substituents among $R_6$ to $R_{10}$ form the benzene ring substituted with —O-Q-P, where Q is an alkylene group or an alkylidene group, and P is a polymerizable functional group such as an alkenyl group, an epoxy group, a cyano group, a carboxyl group, an acryloyl group, a methacryloyl group, an acryloyloxy group, or a methacryloyloxy group.

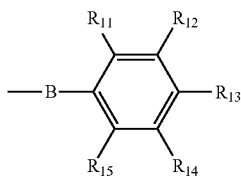

[Formula 2]

In Formula 2, B is a single bond, —COO— or —OCO—, $R_{11}$ to $R_{15}$ are each independently hydrogen, halogen, an alkyl group, an alkoxy group, an alkoxycarbonyl group, a cyano group, a nitro group, or —O-Q-P, or a pair of adjacent substituents among $R_{11}$ to $R_{15}$ may form a benzene ring substituted with —O-Q-P by being connected, with the proviso that at least one of $R_{11}$ to $R_{15}$ is —O-Q-P, or a pair of adjacent substituents among $R_{11}$ to $R_{15}$ form the benzene ring substituted with —O-Q-P by being connected, where Q is an alkylene group or an alkylidene group, and P is a polymerizable functional group such as an alkenyl group, an epoxy group, a cyano group, a carboxyl group, an acryloyl group, a methacryloyl group, an acryloyloxy group, or a methacryloyloxy group.

In Formulas 1 and 2, the forming of the benzene ring substituted with —O-Q-P by being connected to each other may mean that the two adjacent substituents are connected to each other, and thereby a naphthalene backbone substituted with —O-Q-P is formed.

In Formula 2, the mark "—" on the left of B may indicate that B is directly connected to the benzene of Formula 1.

In Formulas 1 and 2, the term "single bond" refers that there is no atom at the part represented as A or B. For example, in Formula 1, when A is a single bond, the benzenes at both sides of A may be directly connected to each other, thereby forming a biphenyl structure.

In Formulas 1 and 2, the halogen may be chlorine, bromine or iodine.

The term "alkyl group" may be, unless particularly defined otherwise, a linear or branched alkyl group having 1 to 20, 1 to 16, 1 to 12, 1 to 8 or 1 to 4 carbon atoms, or a cycloalkyl group having 3 to 20, 3 to 16 or 4 to 12 carbon atoms. The alkyl group may be optionally substituted with at least one substituent.

The term "alkoxy group" may be, unless particularly defined otherwise, an alkoxy group having 1 to 20, 1 to 16, 1 to 12, 1 to 8 or 1 to 4 carbon atoms. The alkoxy group may be a linear, branched or cyclic type. In addition, the alkoxy group may be optionally substituted with at least one substituent.

The term "alkylene group" or "alkylidene group" may be, unless particularly defined otherwise, an alkylene or alkylidene group having 1 to 12, 4 to 10 or 6 to 9 carbon atoms. The alkylene or alkylidene group may be a linear, branched or cyclic type. In addition, the alkylene or alkylidene group may be optionally substituted with at least one substituent.

In addition, the term "alkenyl group" may be, unless particularly defined otherwise, an alkenyl group having 2 to 20, 2 to 16, 2 to 12, 2 to 8, or 2 to 4 carbon atoms. The alkenyl group may be a linear, branched or cyclic type. In addition, the alkenyl group may be optionally substituted with at least one substituent.

In addition, in Formulas 1 and 2, P may be an acryloyl group, a methacryloyl group, an acryloyloxy group or a methacryloyloxy group, preferably, an acryloyloxy group or a methacryloyloxy group, and in another embodiment, an acryloyloxy group.

In the specification, as a substituent capable of being substituted with a specific functional group, an alkyl group, an alkoxy group, an alkenyl group, an epoxy group, an oxo group, an octanyl group, a thiol group, a cyano group, a carboxyl group, an acryloyl group, a methacryloyl group, an acryloyloxy group, a methacryloyloxy group or an aryl group may be used, but the present application is not limited thereto.

The —O-Q-P which may be at least one in Formulas 1 and 2, or the residue of Formula 2 may be present at $R_3$, $R_8$ or $R_{13}$ position. In addition, the substituents which are connected to each other and thus constitute the benzene substituted with —O-Q-P may be $R_3$ and $R_4$ or $R_{12}$ and $R_{13}$. Moreover, in the compound of Formula 1 or the residue of Formula 2, a substituent, other than —O-Q-P or the residue of Formula 2, or a substituent, other than the substituents connected to form benzene, may be hydrogen, halogen, a linear or branched alkyl group having 1 to 4 carbon atoms, an alkoxycarbonyl group including a linear or branched alkoxy group having 1 to 4 carbon atoms, a cycloalkyl group having 4 to 12 carbon atoms, an alkoxy group having 1 to 4 carbon atoms, a cyano group or a nitro group, and in another embodiment, chlorine, a linear or branched alkyl group having 1 to 4 carbon atoms, a cycloalkyl group having 4 to 12 carbon atoms, an alkoxy group having 1 to 4 carbon atoms, an alkoxycarbonyl group including a linear or branched alkoxy group having 1 to 4 carbon atoms or a cyano group.

The polymerizable liquid crystal compound may be included in the liquid crystal layer in a parallel-aligned state. In one embodiment, the compound may be included in the liquid crystal layer in a parallel-aligned polymerized state. The term "parallel-alignment" used herein may mean that an optical axis of the liquid crystal layer including the liquid crystal compound has a tilt angle of approximately 0 to 25, 0 to 15, 0 to 10, 0 to 5 or 0 degrees based on the plane of the liquid crystal layer.

In one embodiment, the liquid crystal layer may have a difference between an in-plane refractive index of a slow axis direction of the liquid crystal layer and an in-plane refractive index of a fast axis direction of the liquid crystal layer to be within a range of 0.05 to 0.2, 0.07 to 0.2, 0.09 to 0.2, or 0.1 to 0.2. The in-plane refractive index of the slow axis direction may refer to a refractive index in a direction exhibiting the highest refractive index on a plane of the liquid crystal layer, and the in-plane refractive index of the fast axis direction may refer to a refractive index in a direction exhibiting the lowest refractive index on a plane of the liquid crystal layer. Usually, the fast axis is perpendicular to the slow axis in the optically-anisotropic liquid crystal layer. The refractive indexes may be measured with respect to light with wavelengths of 550 and 589 nm, respectively. The difference in refractive index may be measured using Axoscan produced by Axomatrix. In addition, the liquid crystal layer may have a thickness of approximately 0.5 to 2.0 μm or 0.5 to 1.5 μm.

The liquid crystal layer having the relationship of the refractive indexes and the thickness may realize a phase retardation characteristic suitable for a purpose to be applied.

The liquid crystal layer may be formed to divide incident light, for example, light incident from one side of the optical filter into two kinds of light having different polarized states, and to emit the light to the other side of the optical filter. To this end, the liquid crystal layer may include the first and second regions having different phase retardation characteristics. In the specification, "the first and second regions having different phase retardation characteristics" may refer to the first and second regions having optical axes formed in the same or different directions and different phase retardation values, or the first and second regions having the same phase retardation values and optical axes formed in different directions when both of the first and second regions have phase retardation characteristics. In another embodiment, "the first and second regions having different phase retardation characteristics" may mean that one of the first and second regions has phase retardation characteristics, and the other region is an optically isotropic region that does not have phase retardation characteristics. In this case, the liquid crystal layer may have all of a region having a liquid crystal compound, and a region not having a liquid crystal compound. Phase retardation characteristics in the first or second region may be controlled by controlling the alignment state of the liquid crystal compound, the relationship of a refractive index of the liquid crystal layer, or the thickness of the liquid crystal layer.

The first and second regions A and B, as shown in FIG. 1, may be closely and alternately disposed in a stripe shape extending in the same direction, or as shown in FIG. 2, may be closely and alternately disposed in a lattice pattern.

For example, when the optical filter is used in a display device displaying a 3D image, one of the first and second regions may be a region for controlling polarization of an image signal for the left eye (hereinafter referred to as an "LC region"), and the other may be a region for controlling polarization of an image signal for the right eye (hereinafter referred to as an "RC region").

At least two kinds of light having different polarized states, which are divided by the liquid crystal layer including the first and second regions, may include two kinds of linearly polarized light having substantially different polarized states, or left-circular polarized light and right-circular polarized light.

In the specification, the terms "vertical," "horizontal," "perpendicular" and "parallel" used to define angles refer to, unless particularly defined otherwise, substantially vertical, horizontal, perpendicular and parallel. The terms include an error or a variation, which may include an error within approximately ±15, 10 or 5, which may be considered for each term.

In one embodiment, one of the first and second regions may be a region capable of transmitting incident light without revolving a polarizing plate, and the other may be a region capable of transmitting incident light after a polarizing axis of the incident light is revolved in a perpendicular direction with respect to a polarizing axis of light transmitted through a different region. In this case, in the liquid crystal layer, the region including a polymerizable liquid crystal compound may be formed in only one of the first and second regions. A region in which the liquid crystal layer is not formed may be an empty space, or have glass or an optically isotropic resin layer or a resin film or sheet.

In another embodiment, one of the first and second regions may be a region capable of converting incident light into left-circular polarized light to transmit, and the other may be a region capable of converting incident light into right-circular polarized light to transmit. In this case, the first and second regions have the same phase retardation values and optical axes formed in different directions, one region may retard a wavelength of incident light by ¼ of the wavelength thereof, and the other may phase-retard a wavelength of incident light by ¾ of the wavelength thereof.

In one embodiment, the first and second regions may have the same phase-retardation value, for example, values capable of phase-retarding a wavelength of incident light by ¼ of the wavelength thereof. In addition, the first and second regions may have optical axes formed in different directions.

The optical filter may include a light transmission control region (hereinafter referred to as a "TC region") present on the boundary between the first and second regions. FIG. 3 is a schematic diagram of the optical filter, in which the TC region is present on the boundary between the first and second regions A and B.

The term "TC region" may refer to a region formed to block light incident to the region, or to transmit only some of light incident to the region when the light is incident to the region. In one embodiment, the TC region may refer to a region having a transmission rate of incident light, that is, light transmission rate, of 0 to 20%, 0 to 15%, 0 to 10%, or 0 to 5%.

In addition, the presence of the TC region on the boundary between the first and second regions may refer to the presence of the TC region at a position to block light incident to the TC region by the TC region, or transmit some of the light incident to the TC region through the TC region, by entering at least some of the incident light to the TC region at one time during emitting light incident to the optical filter through the optical filter.

FIG. 4 shows arrangement of the first and second regions A and B of FIG. 1 in consideration of the presence of the TC region, and FIG. 5 shows arrangement of the LC and RC regions of FIG. 2 in consideration of the presence of the TC region. In FIGS. 4 and 5, the TC region is drawn with a diagonal line. In the optical filter, the TC region may be formed in suitable numbers and places when necessary.

On the boundary between the first and second regions, the first region, the TC region and the second region may be sequentially disposed on the same plane, or the TC region may be disposed on a top or bottom surface of the plane having the first and second regions. When the TC region is disposed on a top or bottom surface of the plane having the first and second regions, the TC region may be overlapped with at least a part of the first and/or second region(s) when the optical filter is observed from front.

In one embodiment, when the first and second regions of the liquid crystal layer include axes formed in different directions, the TC region may be formed parallel to a line bisecting an angle between having the optical axes in the first and second regions, or formed on the bisector. The TC region formed as described above may ensure a wide viewing angle without loss of brightness when being applied to a display device to be described below.

FIG. 4 shows arrangement of axes when the first and second regions A and B of FIG. 1 or 2 have the optical axes formed in different directions. A line of bisecting an angle between the optical axes of the first and second regions A and B may refer to a line bisecting an angle of ($\Theta 1+\Theta 2$). For example, when $\Theta 1$ and $\Theta 2$ are the same angle, the bisector may be formed in a direction formed parallel to a boundary L between the first and second regions A and B. In addition, the angle between the optical axes in the first and second regions may be ($\Theta 1+\Theta 2$), that is, 90 degrees.

The TC region may be formed using light blocking or absorbing ink. In this case, the TC region may include the ink.

For example, in consideration of desired shape, pattern and location of the TC region, the TC region may be formed by a method of printing light blocking or absorbing ink.

A width of the TC region (for example, $H_2$ of FIG. 3) may be defined in the relationship with a first light transmission control region of the display device to be described below. In one embodiment, the width of the TC region may be determined in the range of more than 0 to 1000 μm. The lower limit of the width may be 20, 25, 30, 35, 40, 45, 50, 55, 60, 65, 70, 75 or 80 μm. In addition, the upper limit of the width may be 900, 800, 700, 600, 500, 400, 300, 290, 280, 270, 260, 250, 240, 230, 220, 210 or 200 μm. In the above-mentioned ranges of the upper and lower limits, the width of the TC region may be defined by selecting and combining various values.

The optical filter may further include a base layer. In this case, the liquid crystal layer may be formed on one surface of the base layer. In addition, the TC region may be present between the base layer and the liquid crystal layer, or on a surface of the liquid crystal layer that does not come in contact with the base layer.

The optical filter may further include an alignment layer present between the base layer and the liquid crystal layer. In this case, the TC region may be present between the alignment layer and the liquid crystal layer, or between the alignment layer and the base layer.

FIG. 7 shows an illustrative optical filter 50. The optical filter 50 includes a liquid crystal layer 51, an alignment layer 52 and a base layer 53, which are sequentially formed thereon. Here, a TC region (TC) is present between the liquid crystal layer and the alignment layer. In addition, FIGS. 8 and 9 also show illustrative optical filters 60 and 70, in which a TC region TC is present between the base layer 53 and the alignment layer 52, or on a surface of the liquid crystal layer 51 that does not come in contact with the base layer 53. In FIG. 9, the TC region is present above the liquid crystal layer 51.

The base layer may be glass or a plastic base layer. As a plastic base layer, a sheet or film including a cellulose resin such as triacetyl cellulose (TAC) or diacetyl cellulose (DAC); a cyclo olefin polymer (COP) such as a norbornene derivative; an acryl resin such as poly(methyl methacrylate) (PMMA); polycarbonate (PC); polyolefin such as polyethylene (PE) or polypropylene (PP); polyvinyl alcohol (PVA); poly ether sulfone (PES); polyetheretherketon (PEEK); polyetherimide (PEI); polyethylenenaphthalate (PEN); polyester such as polyethyleneterephthalate (PET); polyimide (PI); polysulfone (PSF) or a fluorine resin, may be illustrated.

The base layer, for example, a plastic base layer, may have a lower refractive index than the liquid crystal layer. An illustrative refractive index of the base layer may be approximately 1.33 to 1.53. When the base layer has a lower refractive index than the liquid crystal layer, brightness is improved, reflection is prevented, and contrast characteristics are improved.

The plastic base layer may be optically isotropic or anisotropic. When the base layer is optically anisotropic, an optical axis of the base layer may be disposed to be vertical or horizontal to the line bisecting the angle between the optical axes of the first and second regions.

In one embodiment, the base layer may include a UV blocking agent or a UV absorbing agent. When the UV blocking agent or the UV absorbing agent is included in the base layer, deterioration of the liquid crystal layer due to UV rays may be prevented. The UV blocking or absorbing agent may be an organic material such as a salicylic acid ester compound, a benzophenone compound, an oxybenzophenone compound, a benzotriazol compound, a cyanoacrylate compound or a benzoate compound, or an inorganic material such as zinc oxide or nickel complex salt. The content of the UV blocking or absorbing agent in the base layer is not particularly limited, and may be suitably selected in consideration of a desired effect. For example, in a process of manufacturing a plastic base layer, the UV blocking or absorbing agent may be included in a weight ratio of approximately 0.1 to 25 wt % based on a main material of the base layer.

The thickness of the base layer is not particularly limited, and may be suitably selected according to a desired use.

The alignment layer, which may be present between the base layer and the liquid crystal layer, may be a layer serving to form the first and second regions by aligning a liquid crystal compound of the liquid crystal layer. As the alignment layer, a conventional alignment layer, which is known in the art, for example, an alignment layer formed by an imprinting method, an optical alignment layer or a rubbing alignment layer may be used. The alignment layer is an optional component, and in some cases, alignment capability may be provided without an alignment layer by directly rubbing or extending the base layer.

In one embodiment, the optical filter may be a filter applied to a stereoscopic image display device (hereinafter, referred to as a "3D device"). In one embodiment, the 3D device may be a device including a display part. When the optical filter is applied to the display device, the optical filter may be disposed to deliver a signal emitted from the display device to an observer after the signal is transmitted through the filter. The 3D device may be a device for observing a 3D image when an observer wears glasses for observing a 3D image (hereinafter referred to as "3D glasses").

The display part may include a signal generating region for the right eye (hereinafter referred to as an "RS region") for generating a signal for the right eye (hereinafter referred to as an "R signal), and a signal generating region for the left eye (hereinafter referred to as an "LS region") for generating a signal for the left eye (hereinafter referred to as an "L signal") in a driving state. The term "driving state" may refer to a state in which a 3D device displays an image, for example, a 3D image.

The optical filter may be applied to the 3D device and serve to control polarized states of the R and L signals, for example, to control the R and L signals to have different polarized states.

The display part may also include a light transmission control region (TC region) adjacent to the RS and LS regions. Hereinafter, in the specification, for distinction between the TC regions, a TC region included in the display part may be referred to as a TC1 region, and a TC region included in the optical filter may be referred to as a TC2 region.

The TC1 region may also mean a region having a light transmission rate of 0 to 20%, 0 to 15%, 0 to 10%, or 0 to 5%.

In addition, the TC region adjacent to the RS and LS regions may mean that the TC region is present at such a location that a signal incident to the TC region may be blocked by the TC region or some of the signal incident to the TC region is transmitted through the TC region, and then delivered to the optical filter by entering at least a part of the R and/or L signal to the TC region during the delivery of the R and/or L signal generated in the RS and/or LS region(s) to the optical filter when an image is observed at at least one angle included in a range of the viewing angle.

The term "viewing angle" may refer to a range of an angle in which the L signal generated in the LS region may be transmitted through a signal polarization control region for a left eye (hereinafter, referred to as a "LG region"), which is one of the first and second regions of the optical filter, but not transmitted through a signal polarization control region for a right eye (hereinafter, referred to as a "RG region"), which is the other of the first and second regions, and then may be delivered to an observer, or a range of an angle in which the R signal generated in the RS signal may be transmitted through the RG region of the optical filter but not transmitted through the LG region, and then delivered to the observer. At an angle exceeding the viewing angle, the L signal may be transmitted through the RG region, or the R signal may be transmitted through the LG region, and then delivered to the observer.

The TC1 region adjacent to the RS and LS regions may be disposed between the RS and LS regions. In an aspect in which the TC1 region is present between the RS and LS regions, the RS, TC1 and LS regions may be sequentially disposed on the same plane, or the TC1 region may be disposed on a top or bottom surface of a plane having the RS and LS regions. When the TC1 region is disposed on a top or bottom surface of a plane having the RS and LS regions, the TC1 region may be overlapped with at least a part of the RS and/or LS region(s) when observed from front.

FIG. 10 is a schematic diagram of an illustrative 3D device 80 to which the optical filter 801 is applied. The illustrative 3D device 80 to which the optical filter 801 is applied as shown in FIG. 10, may include a display part 81 and the optical filter 801. The display part 81 may include a light source 821, a first polarizing plate 822, an image generating region 823 and a second polarizing plate 824. RS and LS regions may be included in the image generating region 823, and the first polarizing plate 822 and the light source 821 may be sequentially included at one side of the image generating region 83.

As the light source 821, a direct-type or edge-type back light unit (BLU), which is conventionally used as the light source in a display device such as a liquid crystal display (LCD), may be used. As the light source 821, other than that, various kinds of light sources may be used.

In the display part 81, the first polarizing plate 822 may be disposed between the light source 821 and the image generating region 823. Due to such arrangement, light emitted from the light source 821 may be incident to the image generating region 823 through the first polarizing plate 822. The first polarizing plate may be an optical element having a transmission axis and an absorption axis perpendicular to the transmission axis. When light is incident to the first polarizing plate, among incident light, only light having a polarizing axis parallel to a direction of the transmission axis of the polarizing plate may be transmitted.

The image generating region 823 may include the LS region capable of generating an L signal, and an RS region capable of generating an R signal in a driving state.

In one embodiment, the image generating region 83 may be a region formed by a transparent liquid crystal panel having a liquid crystal layer interposed between two sheets of substrates, or a region formed in the liquid crystal panel. The liquid crystal panel may include a first substrate, a pixel electrode, a first alignment layer, a liquid crystal layer, a second alignment layer, a common electrode and a second substrate, which are sequentially disposed from the light source 821. The first substrate may have an active driving circuit including a thin film transistor (TFT) as a driving element electrically connected to a transparent pixel electrode and an interconnection. The pixel electrode may include a metal oxide such as indium tin oxide (ITO) and serve as an electrode per pixel. In addition, the first or second alignment layer may serve to orient a liquid crystal of the liquid crystal layer. The liquid crystal layer may include a vertical alignment (VA)-, twisted nematic (TN)-, super twisted nematic (STN)- or in plane switching (IPS)-mode liquid crystal. The liquid crystal layer may function to transmit or block light emitted from the light source 821 by pixel by a voltage applied from the driving circuit. The common electrode may serve as a counter electrode.

The image generating region 823 may include LS and RS regions including at least one pixel as regions capable of generating L and R signals in a driving state. For example, the LS or RS region may be formed of a unit pixel including liquid crystals, which is sealed between the first and second alignment layers of the liquid crystal panel. The LS and RS regions may be disposed in column and/or row direction(s).

FIGS. 11 and 12 show illustrative arrangements of RS and LS regions. FIGS. 11 and 12 may show arrangements of the RS and LS regions when the 3D device is observed from front. In one embodiment, as shown in FIG. 11, the RS and LS regions may have stripe shapes extending in the same direction, for example, a length direction, and may be closely and alternately disposed. In another embodiment, as shown in FIG. 12, the RS and LS regions are closely and alternately disposed in a lattice pattern. However, the arrangement of the RS and LS regions are not limited to those of FIGS. 11 and 12, and thus various designs known in the art may be applied.

The display part 81 may generate image signals including R and L signals by driving a pixel in each region in response to a signal in a driving state.

For example, referring to FIG. 10, when light emitted from the light source 821 is incident to the first polarizing plate 822, only light polarized parallel to the transmission axis of the polarizing plate 822 may be transmitted through the polarizing plate 822. Such transmitted light is incident to the image generating region 823. When the light is incident to the image generating region 823, light transmitted through the RS region may be converted into an R signal, and light transmitted through the LS region may be converted into an L signal.

The display part 81 may include the TC1 region. The TC1 region may be adjacent to the RS and LS regions. In FIG. 10 schematically showing the illustrative device 80, the TC1 region is disposed on a top surface of the plane of the image generating region 823 having the RS and LS regions, and overlapped with a part of the RS and LS regions between the RS and LS regions when viewed form front. However, the location of the TC1 region is not limited to the arrangement shown in FIG. 10. For example, the TC1 region may be disposed on a bottom surface of the plane having the RS and LS regions, or on the same plane as the plane having the RS and LS regions. FIG. 13 shows the arrangement of the LS and RS regions shown in FIG. 11 again in consideration of the presence of the TC1 region, and FIG. 14 shows the arrangement of the LS and RS regions show in FIG. 12 again in consideration of the presence of the TC1 region. In FIGS. 13 and 14, the TC1 regions are drawn with a diagonal line.

The TC1 region may be combined with a TC2 region for the 3D device to display an image at a wide viewing angle without loss of brightness.

In one embodiment, the TC1 region may be a black matrix. For example, when the image generating region 823 is a region formed by a transparent liquid crystal panel or a region formed therein, the TC1 region may be a black matrix included in a color filter conventionally present in the second substrate capable of being included in the liquid crystal panel as described above. In one embodiment, the TC1 region may be a region formed to include a resin layer including a pigment such as chromium (Cr), a double film of chromium and chromium oxide (double film of Cr/CrOx), carbon black, or a carbon pigment or graphite. A method of forming the TC1 region using the above-described material is not particularly limited. For example, the TC1 region may be formed by photolithography or a lift-off method, which is a conventional method of forming the black matrix.

In the 3D device, the second polarizing plate 824 may be included between the image generating region 823 and the optical filter 801. The optical filter 801 includes the LG region, which is one of the first and second regions, and the RG region, which is the other thereof. In addition, the TC2 region may be adjacent to the LG and RG regions.

A signal output from the image generating region 823 may be delivered to an observer sequentially through the second polarizing plate 824 and the optical filter 801. In addition, at least a part of the R and/or L signal(s) may be incident to the TC2 region at one time during the transmission of the signals through the optical filter 801 when observed at one angle in the range of the viewing angle.

Like the first polarizing plate 822, the second polarizing plate 824 may be an optical element having a transmission axis and an absorption axis perpendicular to the transmission axis, and may transmit only a signal having a polarizing axis parallel to a direction of the transmission axis when light is incident. The first and second polarizing plates 822 and 824 included in the 3D device 80 may be disposed such that the absorption axes are vertical to each other. The transmission axes of the first and second polarizing plates 822 and 824 may also be vertical to each other. Here, "vertical" means substantially vertical, and may include an error within ±15, 10, or 5.

The RG and LG regions included in the optical filter 801 may control polarized states of the R and L signals, respectively. According to the above descriptions, the RG and LG regions may be regions serving to output the R and L signals with different polarized states from the 3D device.

The RG region may be disposed at a location approximately corresponding to the RS region to have a size approximately corresponding to the RS region such that the R signal generated and delivered from the RS region is incident thereto in a driving state, and the LG region may be disposed at a location approximately corresponding to the LS region to have a size approximately corresponding to the LS region such that the L signal generated and delivered from the RS region is incident thereto in a driving state. The forming of the RG or LG regions at a location corresponding to the RS or LS region to have a size corresponding to the RS or LS region may mean that the RG or LG region has the location and size in which the R signal generated in the RS region is capable of being incident to the RG region, or the L signal generated in the LS region is capable of being incident to the LG region. However, it does not mean that the RG and LG regions are necessarily formed at the same location to have the same size.

The RG and LG regions may be formed in a stripe shape extending in the same direction corresponding to the arrangement of the RS and LS regions, for example, a length direction, and closely and alternately disposed, or may be closely and alternately disposed in a lattice pattern.

The 3D device including the optical filter includes the TC1 and TC2 regions. Such a device may display a 3D image at a wide viewing angle without the loss of brightness.

In one embodiment, when the optical filter is a filter applied to the 3D device, the TC1 and TC2 regions may satisfy Expression 1. Accordingly, the wide viewing angle may be exhibited while suitably ensuring brightness characteristics of the 3D device within a range satisfying Expression 1.

$$H_1+H_2 \leq (P_L+P_R)/2 \quad \text{[Expression 1]}$$

In Expression 1, $H_1$ is the width of the TC1 region, $H_2$ is the width of the TC2 region, $P_L$ is the width of the LG region, that is, the width of the first or second region, and $P_R$ is the width of the RG region, that is, the width of the second or first region.

FIG. 15 schematically shows only the image generating region 823 including the TC1 region, the second polarizing plate 824 and the optical filter 801 in the 3D device including the optical filter when viewed from the side, and here, "$H_1$", "$H_2$", "$P_L$", and "$P_R$" each are shown.

In the 3D device, a specific range of "$H_1$" and "$H_2$" may be suitably selected in consideration of the range satisfying Expression 1 according to the specifications of the 3D device, and specific values are not particularly limited. For example, $H_2$, that is, the width of the TC2 region, may be selected within the above-described range.

In addition, "$H_1$" may be selected to be a sum of $H_1$ and $H_2$ within a range of approximately more than 0 to 2,000 μm. The lower limit of the sum of $H_1$ and $H_2$ may be 40, 50, 60, 70, 80, 90, 100, 110, 120, 130, 140, 150 or 160 μm. In addition, the upper limit of the sum of $H_1$ and $H_2$ may be 1900, 1800, 1700, 1600, 1500, 1400, 1300, 1200, 1100, 1000, 900, 800, 700, 600, 500, 400, or 300 μm. In the ranges of the upper and lower limits, various values may be selected and combined to define the range of the sum of $H_1$ and $H_2$.

In the 3D device, a specific range of "$P_R$" or "$P_L$," that is, the width of the first or second region of the optical filter, may be also selected according to the specification of the 3D device, and a specific value is not particularly limited. In one embodiment, when the 3D device is a 47-inch device, the specific ranges of "$P_R$ and $P_L$" may be selected within the range of 150 to 350 μm, respectively. In consideration of the specification of a conventional device, the specific ranges of "$P_R$ and $P_L$" may be within the range of 150 to 1,000 μm.

The width $H_2$ of the TC2 region of the optical filter may be the same as or smaller than the width $H_1$ of the TC1 region of the 3D device to which the filter is applied. In one embodiment, the difference ($H_1-H_2$) between the width $H_1$ of the TC1 region and the width $H_2$ of the TC2 region may be approximately 1,000, 900, 800, 700, 600, 500, 400, 300, 175, 150, 125, 100, 75, 50, or 25 μm, or substantially 0 μm. In such a state, the 3D device may ensure a wide viewing angle without loss of brightness.

The 3D device to which the optical filter is applied may have relative brightness of 60%, 65% or 70% or more when viewed from the front. The term "relative brightness" may refer to a ratio ($I_T/I_O$) of brightness $I_T$ of a 3D device having TC1 and TC2 regions formed with respect to brightness $I_O$ of a 3D device having neither TC1 nor TC2 regions.

The TC2 region of the optical filter applied to the 3D device may have the maximum values of an angle ($\theta_U$) satisfying Expression 2 and an angle ($\theta_L$) satisfying Expression 3 of 3, 5, 8, 8.5, 9, 9.5, 10, 10.5, 11, 11.5, 12, 12.5, 13, 13.5, 14, 14.5 or 15 or more, respectively.

$$\tan \theta_U=(H_1+2y)/2T \quad \text{[Expression 2]}$$

$$\tan \theta_L=(H_1+2H_2-2y)/2T \quad \text{[Expression 3]}$$

In Expressions 2 and 3, $H_1$ is the width of the TC1 region, $H_2$ is the width of the TC2 region, T is the distance from the display part of the 3D device to which the optical filter is applied to the optical filter, and y is the distance from a spot at which an imaginary normal line of a line bisecting the width of the TC1 region of the 3D device to which the optical filter is applied with respect to a surface of the TC1 region is in contact with the TC2 region to a part of the TC2 region.

"$\theta_U$" and "$\theta_L$" may refer to viewing angles of the 3D device, respectively. Expressions 2 and 3 will be described in detail with reference to FIG. 16.

Considering that the term "viewing angle" refers to a range of an angle in which the L signal generated from the image generating region is transmitted through the LG region, but not through the RG region, to be delivered to an observer, or a range of an angle in which the L signal generated from the image generating region is transmitted through the RG region, but not through the LG region, to be delivered to an observer, the viewing angle is represented as "$\theta_U$" or "$\theta_L$" in FIG. 16.

As shown in FIG. 16, the viewing angle may be determined according to the distance T from the image generating region to the optical filter and the widths of the TC1 and TC2 regions. The distance T from the image generating region to the optical filter may be a distance from a surface of the image generating region facing the optical filter to the position at which the TC2 region of the optical filter ends. For example, when the image generating region is a region formed by a liquid crystal panel, the surface of the image generating region facing the optical filter may refer to a surface of the liquid crystal layer of the liquid crystal panel facing the optical filter.

The distance T is determined according to the specification of the 3D device, and is not particularly limited. For example, the distance T may be 5 nm or less, or approximately 0.5 to 5 mm.

Referring to FIG. 16, it is seen that the viewing angles "$\theta_U$" and "$\theta_L$" are determined according to the widths ($H_1$ and $H_2$) of the TC1 and TC2 regions and relative locations of the TC1 and TC2 regions when the distances T are the same as each other.

That is, it is seen that the viewing angle "$\theta_U$" is determined for tan $\theta_U$ to be the same as a value obtained by dividing the sum ($H_1/2+y$) of a value of half of the width $H_1$ of the TC1 region and the distance y from a point at which an imaginary normal line C of a line bisecting the width of the TC1 region with respect to a surface of the TC1 region or image generating region is in contact with the TC2 region to a part in which the TC2 region is present by the distance T. In addition, it is seen that the viewing angle "$\theta_L$" is determined for tan $\theta_L$ to be the same as a value obtained by dividing the sum ($H_1/2+y$) of a value of half of the width $H_1$ of the TC1 region and the distance y from a point at which an imaginary normal line C of a line bisecting the width $H_1$ of the TC1 region with respect to a surface of the TC1 region or image generating region is in contact with the TC2 region in the width $H_2$ of the TC2 region to a part in which the TC2 region is present by the distance T.

In the 3D device including the TC1 and TC2 regions, sizes, for example, widths, and relative positions of the TC1 and TC2 regions may be suitably controlled to ensure a wide viewing angle and excellent brightness characteristics when a 3D image is observed.

In the 3D device, relative brightness, when observed from front, may be 60, 65, or 70% or more, and at the same time, the maximum value of the angle "$\theta_U$" satisfying Expression 2 and the maximum value of the angle "$\theta_L$" satisfying Expression 3 are 3, 5, 8, 8.5, 9, 0.5, 10, 10.5, 11, 11.5, 12, 12.5, 13, 13.5, 14, 14.5 or 15 degrees or more.

In another aspect, a display device, and specifically, a 3D device including the above-described optical filter is provided. Detailed descriptions of the 3D device have been described above.

In still another aspect, a method of manufacturing the optical filter is provided. The illustrative manufacturing method may include forming a TC2 region on the boundary of a liquid crystal layer including first and second regions, which have different phase retardation characteristics and are adjacent to each other. Here, the TC2 region may be formed before or after the liquid crystal layer is formed, or together with the liquid crystal layer.

The liquid crystal layer may be manufactured by forming an alignment layer on a base layer, forming a coating layer of a liquid crystal composition including the polymerizable liquid crystal compound on the alignment layer, and polymerizing the aligned liquid crystal composition.

The alignment layer may be formed by forming a polymer film such as a polyimide film on the base layer and rubbing the polymer film, or coating a photo-alignment compound and aligning the photo-alignment compound through irradiation of linearly polarized light or nano-imprinting the photo-alignment compound. Depending on a desired alignment pattern, for example, the patterns of the first and second regions, various methods of forming an alignment layer are known in related art.

The coating layer of the liquid crystal composition may be formed by coating the composition on the alignment layer of the base layer by a known method. The composition may be aligned according to an alignment pattern of the alignment layer present under the coating layer and then polymerized, thereby forming the liquid crystal layer.

The TC2 region may be formed by a printing method using the above-described light blocking or absorbing ink in consideration of the positions of the first and second regions to be formed before and after the liquid crystal layer is formed. In this case, the printing may be executed on a surface of the base layer on which the alignment layer will be formed, the alignment layer on which the liquid crystal layer will be formed or the liquid crystal layer, and, for example, in consideration of the accuracy of a position of the TC2 region to be formed, the printing may be executed on a surface of the alignment layer.

For example, the printing process may be performed using a printing ink prepared by blending light blocking or absorbing ink including an inorganic pigment such as carbon black, graphite or iron oxide, or an organic pigment such as an azo-based pigment or phthalocyanine-based pigment with a suitable binder and/or solvent. For example, light transmission rate of the TC region may be controlled by controlling the blending amount or kind of pigment. The printing method may be, but is not particularly limited to, a printing type method such as screen printing or gravure printing, or a selective jetting type method such as inkjet printing.

BRIEF DESCRIPTION OF THE DRAWINGS

FIGS. 1 and 2 show arrangements of first and second regions of an illustrative optical filter;

FIGS. 11 and 12 are schematic diagrams showing illustrative arrangement of LS and RS regions;

DETAILED DESCRIPTION OF EXEMPLARY EMBODIMENTS

Figure 1:
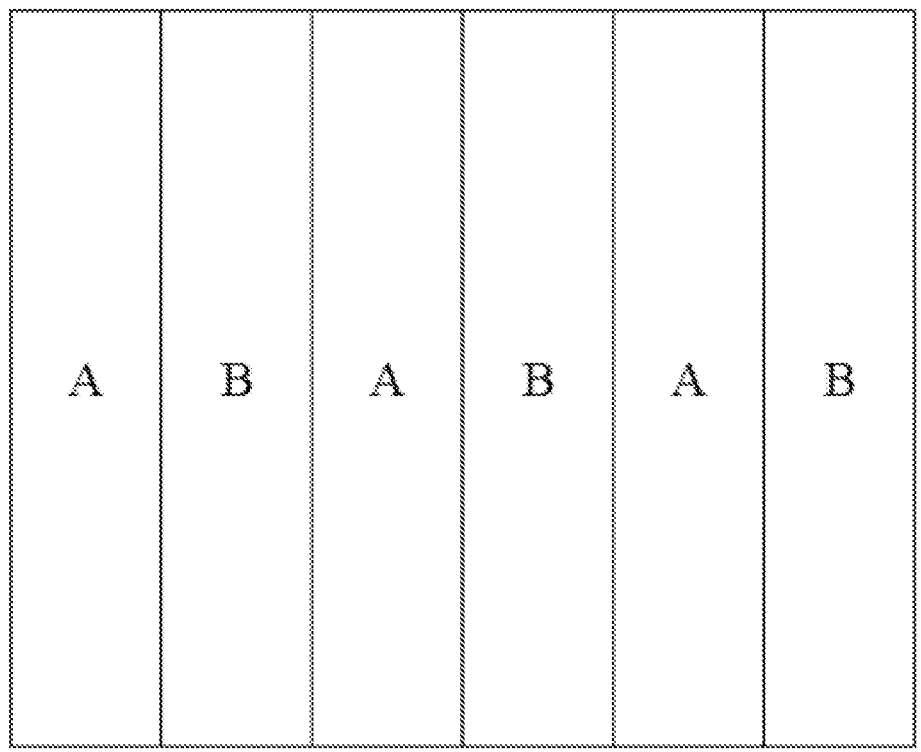
Figure 3:
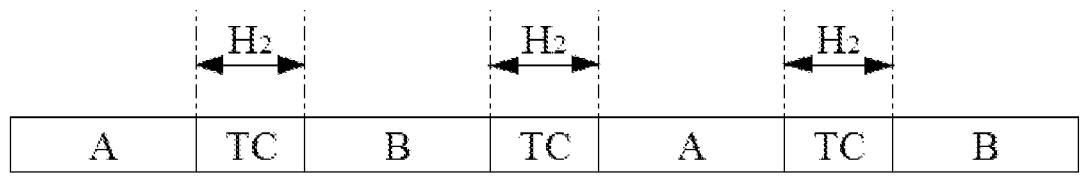
FIG. 3 shows formation of optical axes of first and second regions.
Figure 4:
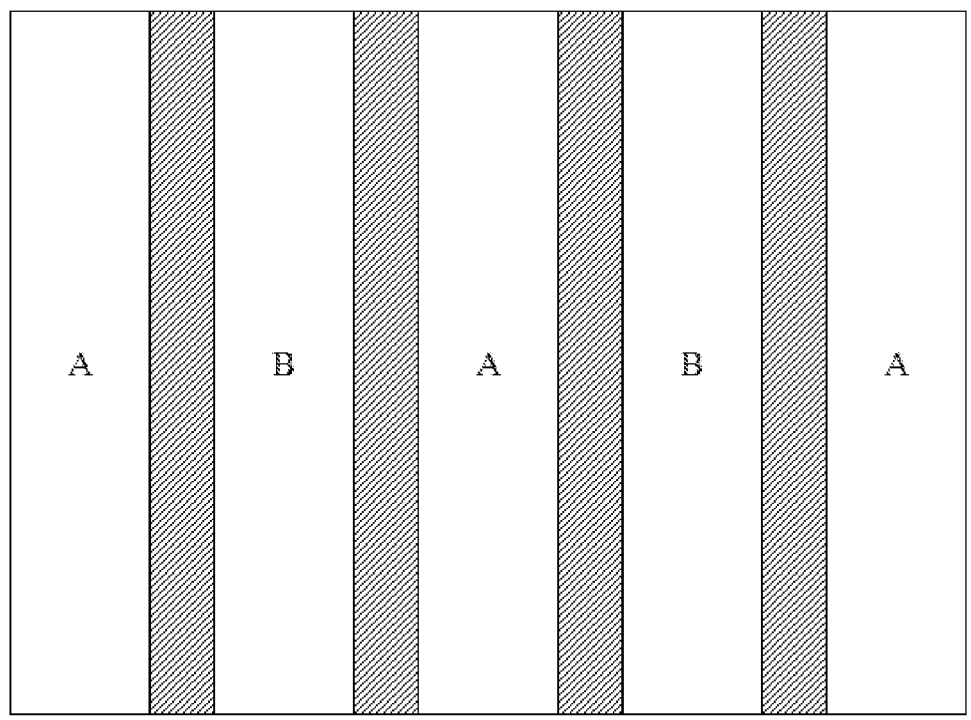
FIG. 4 shows an illustrative optical filter.

Hereinafter, an optical filter and a 3D device will be described in detail with reference to Examples according to the present application and a Comparative Example not according to the present application, but the optical filter and 3D device are not limited to the following Examples.

Example 1

A composition for forming a photo-alignment layer was coated on one surface of a TAC base (refractive index: 1.49, thickness: 80,000 nm) to have a dry thickness of approximately 1,000 Å, and then dried in an 80° C. oven for 2 minutes. As the composition for forming a photo-alignment layer, a composition prepared by mixing a mixture of polynorbornene (molecular weight ($M_w$)=150,000) having a cinnamate group of Formula 3 and an acryl monomer with a photoinitiator (Irgacure 907), and dissolving the resulting mixture in a toluene solvent to have a solid content of polynorbornene of 2 wt % was used (polynorbornene:acryl monomer:photoinitiator=2:1:0.25 (weight ratio)).

[Formula 3]

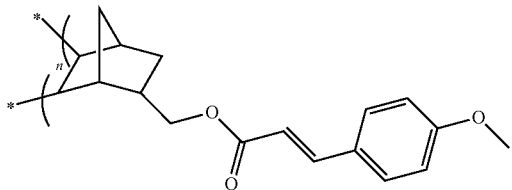

Subsequently, the dried composition for forming a photo-alignment layer was aligned according to the method disclosed in Korean Patent Application No. 2010-0009723 to form a photo-alignment layer including first and second alignment regions, which were aligned in different directions. In detail, a pattern mask having stripe-shaped light transmission and light blocking parts each having a width of approximately 450 μm and alternately formed in vertical and lateral directions was disposed on the dried composition for a photo-alignment layer, and a polarizing plate having two regions transmitting different polarized light, respectively, was disposed on the pattern mask. Afterward, with transferring the TAC base 30 having the photo-alignment layer at a rate of approximately 3 m/min, alignment was executed by irradiating a UV ray (300 mW/cm$^2$) to the composition for forming a photo-alignment layer for approximately 30 seconds by means of the polarizing plate and the pattern mask. By such alignment, a first alignment region A and a second alignment region B were formed in the shape shown in FIG. 1. The angle between alignment directions of the respective alignment regions was 90 degrees, and the angle between the alignment direction of each alignment region and the boundary between the first and second regions A and B was 45 degrees in a clockwise or counter-clockwise direction. Subsequently, as light absorbing ink, ink prepared by mixing a carbon black dispersion to a mixture of an acrylate-based binder (dipentaerythritol hexaacrylate) and a carbonyl-based solvent in a concentration of approximately 70 wt % and further blending approximately 2 wt % of a photoinitiator (Irgacure 907), was printed to a thickness of approximately 3 μm using inkjet equipment (Dymatrix DMP2800, Fuji film) to be parallel to a bisector of an angle between alignment directions of the first and second regions on the boundary of the first and second regions A and B and cured, thereby forming a TC region. The printing was executed by an inkjet-type method. A liquid crystal layer was then formed in the aligned alignment layer and the TC region. In detail, as a liquid crystal composition, a liquid crystal composition including 70 parts by weight of a multifunctional polymerizable liquid crystal compound represented by Formula A, 30 parts by weight of a monofunctional polymerizable liquid crystal compound represented by Formula B, and a suitable amount of a photoinitiator was coated to have a dry thickness of approximately 1 μm and then aligned according to alignment of the underlying alignment layer. Liquid crystals were crosslinked and polymerized by irradiating a UV ray (300 mW/cm$^2$) for approximately 10 seconds, and thus a liquid crystal layer having first and second regions having optical axes perpendicular to each other according to the alignment of the underlying photo-alignment layer. As measurement results using Axoscan produced by Axomatrix, the difference in refractive index between the slow axis direction and the fast axis direction was approximately 0.125. In addition, the liquid crystal layer was formed to a thickness of approximately 1 μm.

[Formula A]

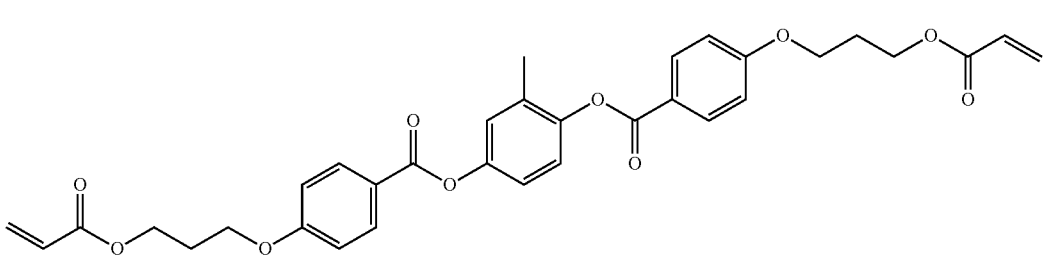

[Formula B]

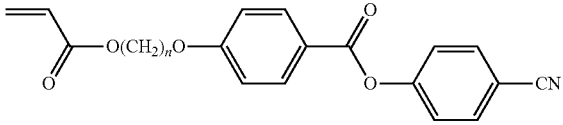

Example 2

An optical filter was manufactured by the same method as described in Example 1, except that printing for forming a TC region was executed on a liquid crystal layer after the liquid crystal layer was formed.

Example 3

An optical filter was manufactured by the same method as described in Example 1, except that printing for forming a TC region was executed on a surface of the base layer (TAC base).

Examples 4 to 7

Figure 5:
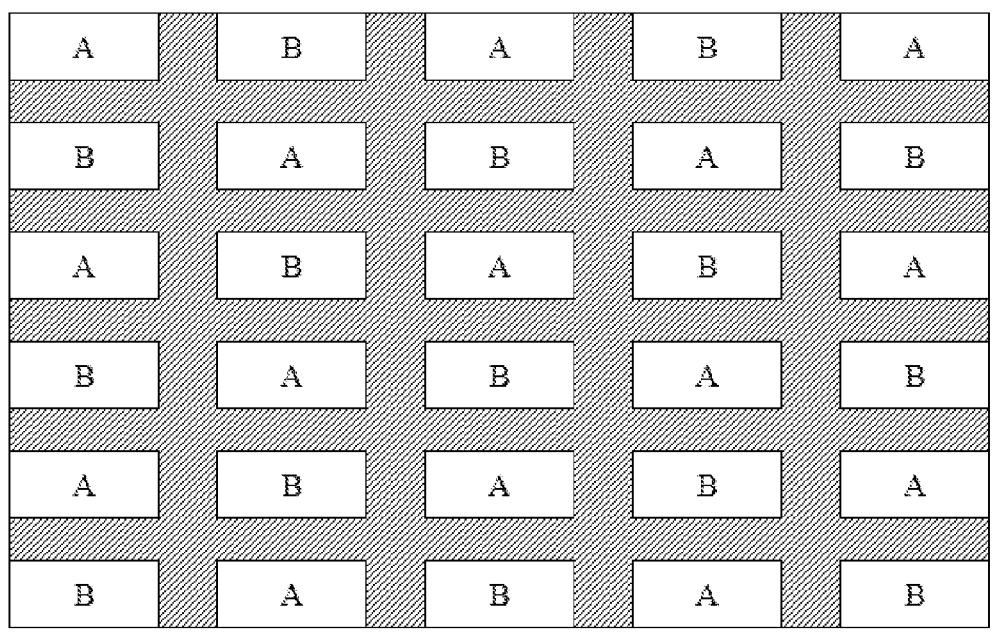
FIGS. 5 and 6 show arrangements of first and second regions, and a TC region of an illustrative optical filter.
Figure 6:
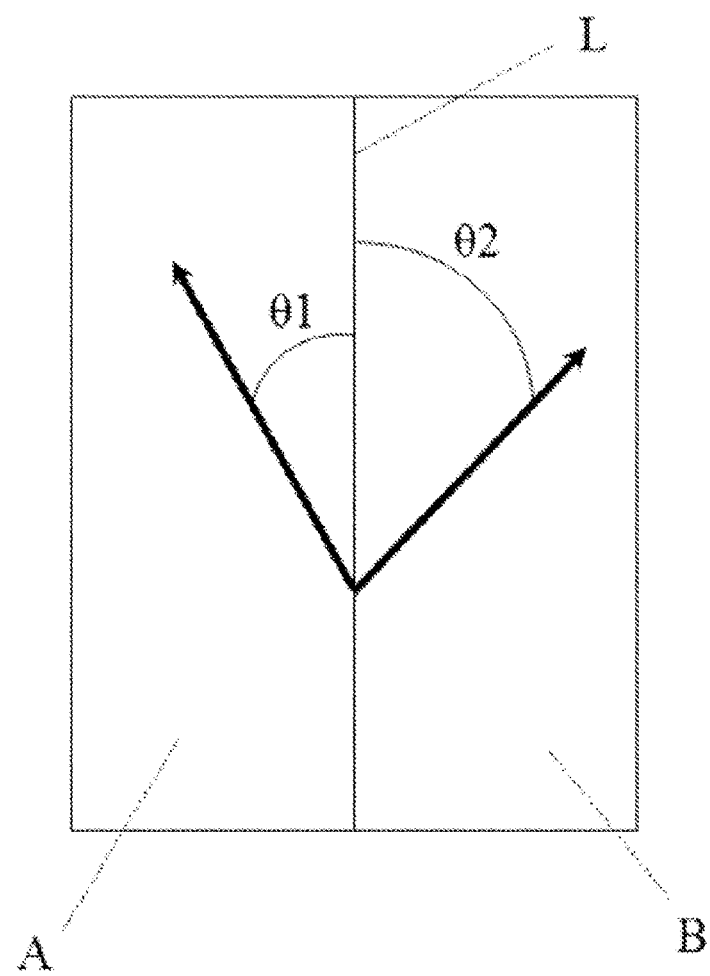
Figure 7:
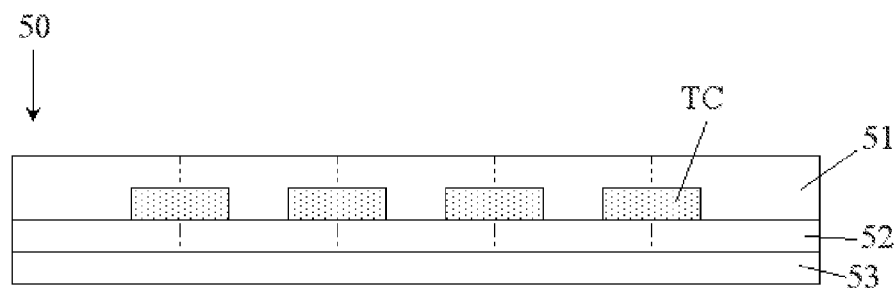
FIGS. 7 to 9 show shapes of the illustrative optical filter.
Figure 8:
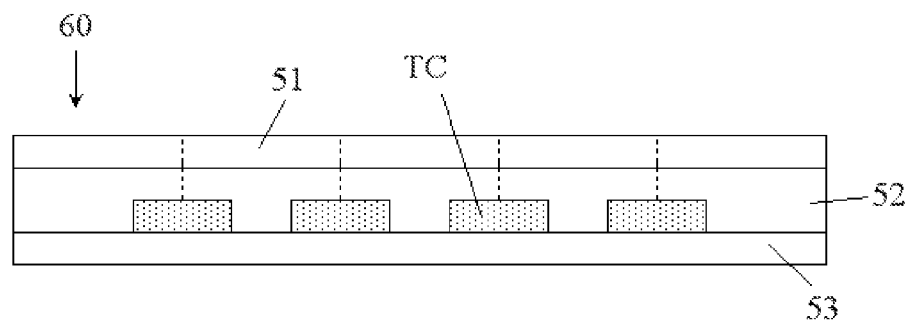
Figure 9:
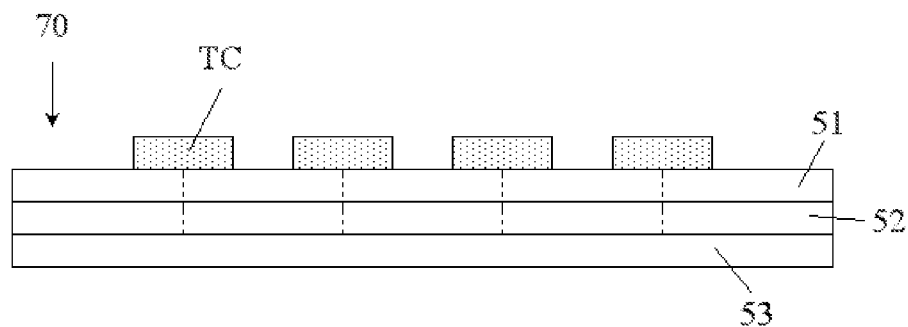
Figure 10:
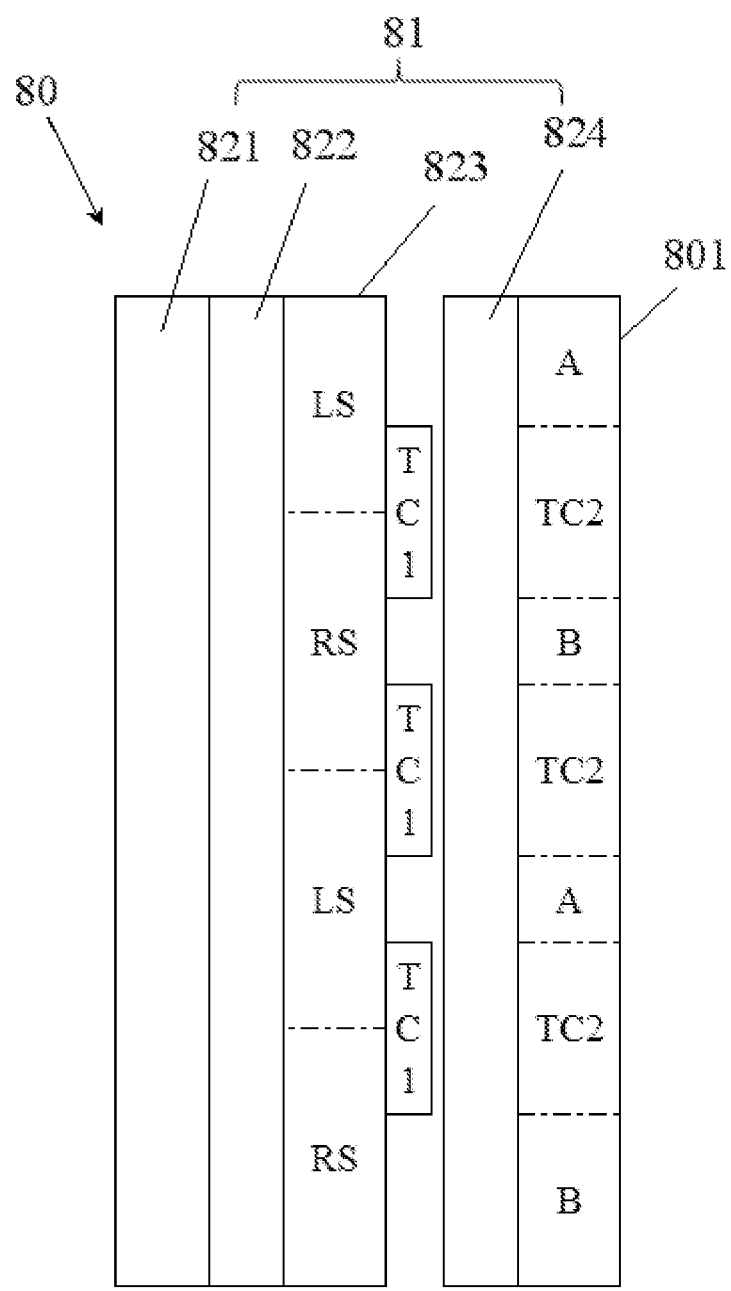
FIG. 10 shows an illustrative 3D device.
Figure 11:
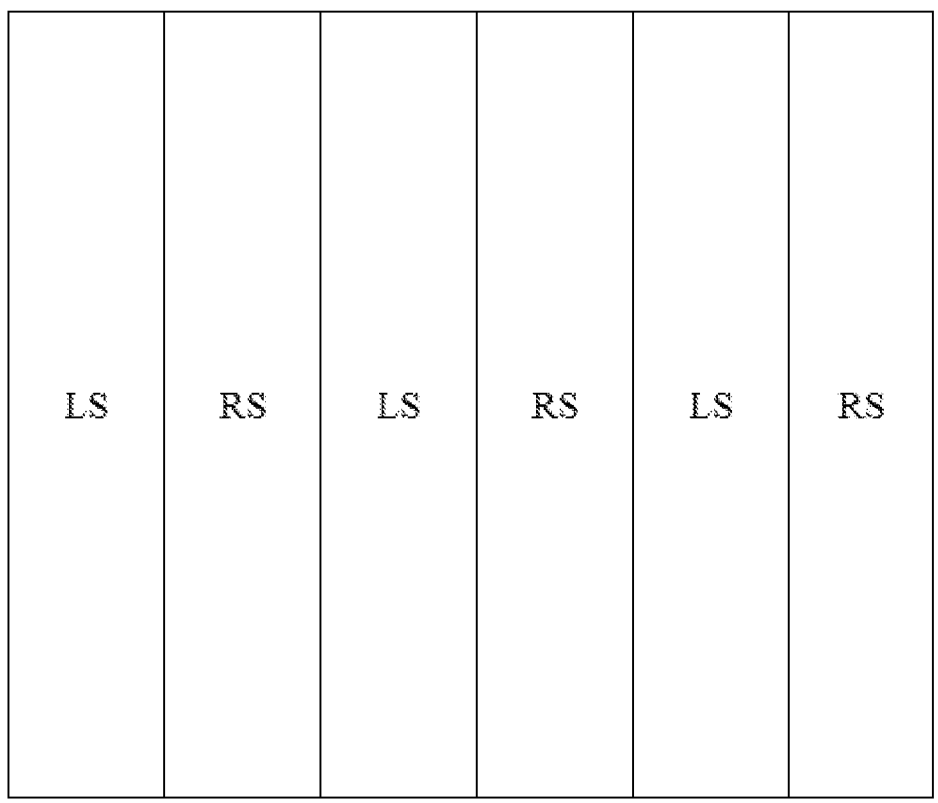
Figure 13:
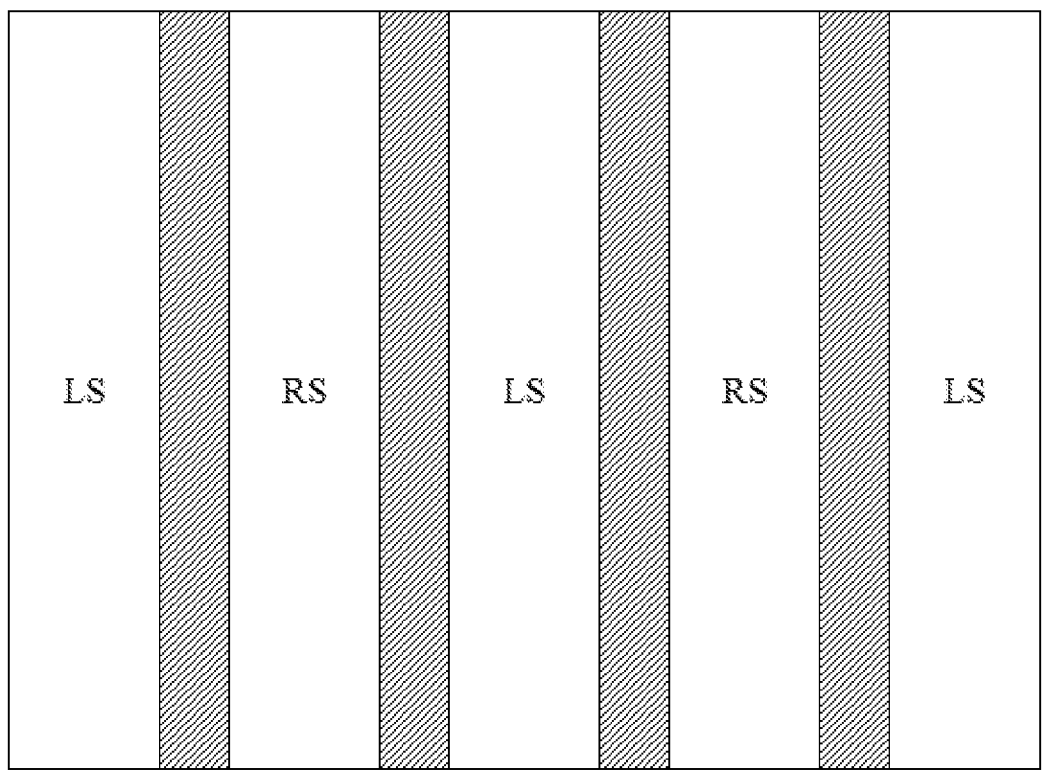
FIGS. 13 and 14 are schematic diagrams showing illustrative arrangement of LS and RS regions and a TC1 region.
Figure 14:
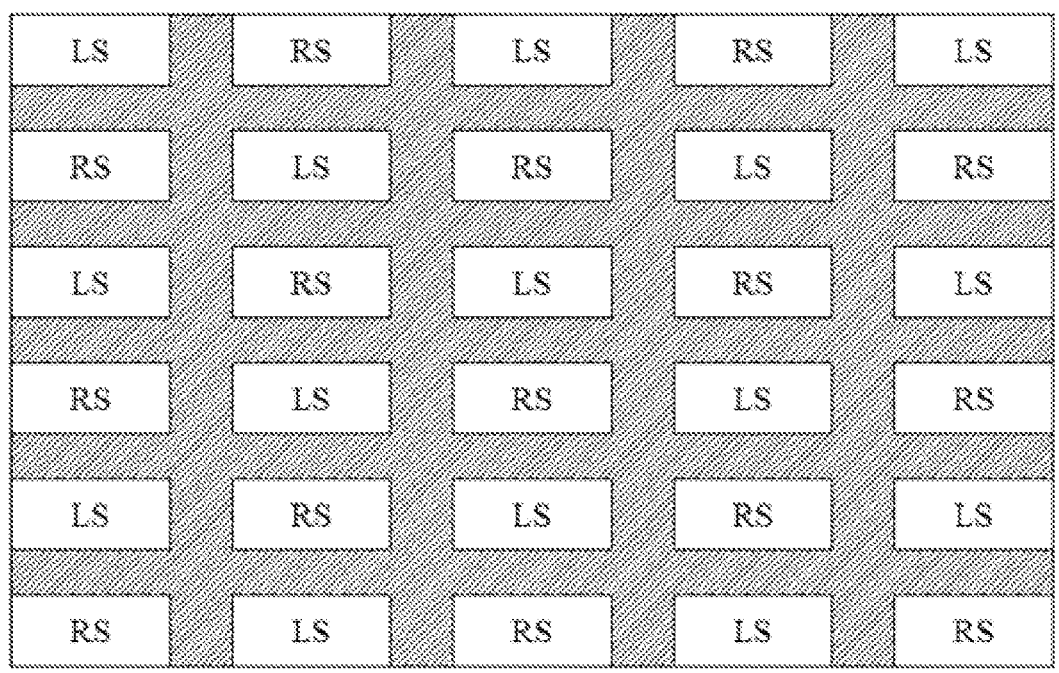
Figure 15:
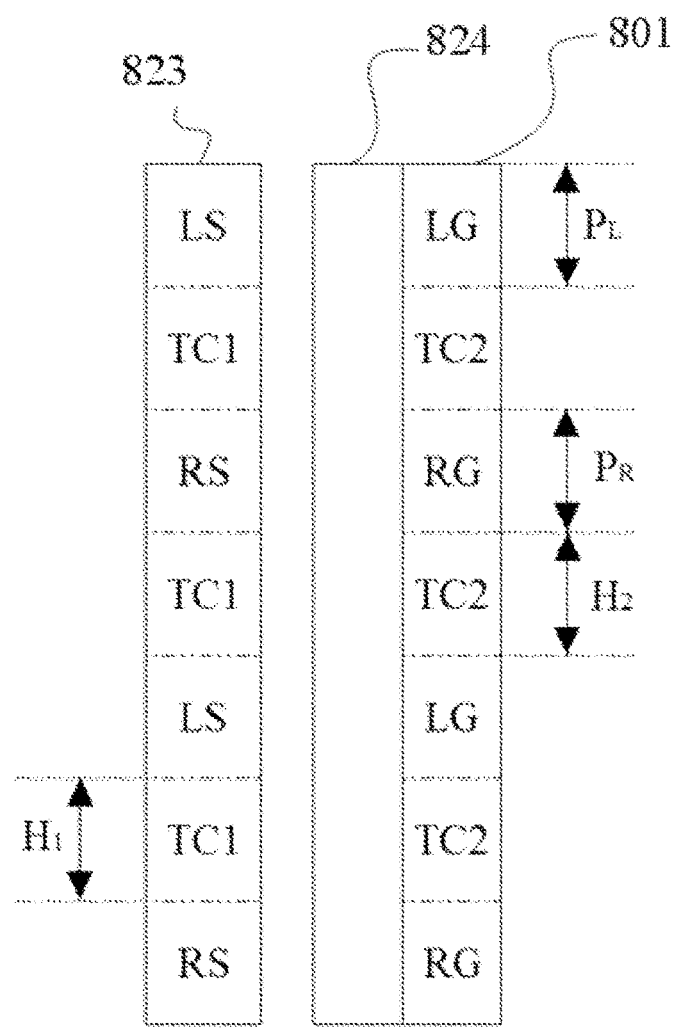
FIG. 15 shows an illustrative 3D device.
Figure 16:
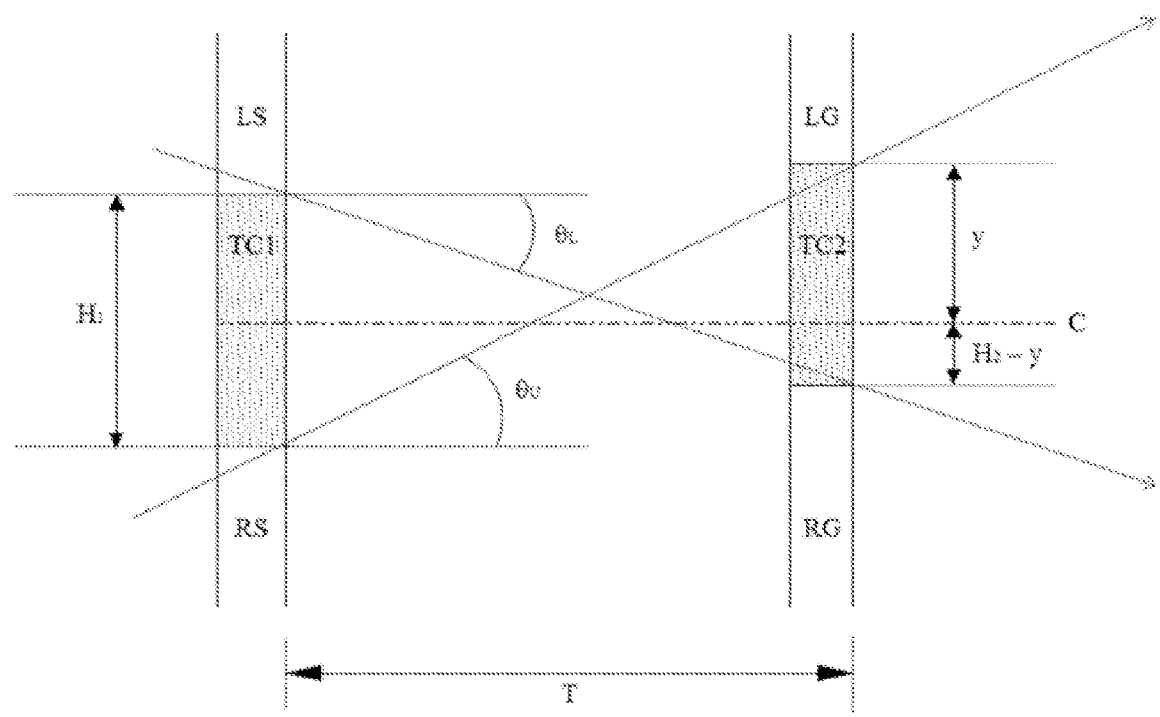
FIG. 16 is a schematic diagram for explaining formation of a viewing angle in a 3D device.

A system was configured to include an optical filter 801 manufactured by the same method as described in Example 1 and having the structure shown in FIG. 10. In the system, an image generating region 823 was a transparent liquid crystal panel, RS and LS regions were disposed as shown in FIG. 11, and a TC1 region was formed by a black matrix of a color filter of the liquid crystal panel, and disposed between the RS and LS regions to be partially overlapped with the RS and LS regions as shown in FIG. 13. The TC1 region was formed such that a range overlapped with the RS region was the same as a range overlapped with the LS region. In addition, first and second regions of the optical filter 801 were disposed in a shape as shown in FIG. 1. A TC2 region was formed to be overlapped with a part of the first and second regions A and B and disposed as shown in FIG. 5 between the regions A and B. The TC2 region was formed such that a range overlapped with the RG region (one of the first and second regions) was the same as a range overlapped with the LG region (the other of the first and second regions) (that is, referring to FIG. 16, the TC2 region was formed such that y was $H_2/2$). A region of the liquid crystal layer, the RG region, was a phase retardation layer (¼ wavelength layer) in which a slow axis was formed in a counter-clockwise direction to have an angle of 45 degrees with an absorption axis of a second polarizing plate 824, and a region of the liquid crystal layer, the LG region, was a phase retardation layer (¼ wavelength layer) in which a fast axis was formed in a clockwise direction to have an angle of 45 degrees with the absorption axis of the second polarizing plate 824. The optical axis of the second polarizing plate 824 was arranged in a vertical direction with respect to an optical axis of the first polarizing plate. The distance from a display part to the optical filter (T in Expressions 2 and 3) was approximately 1 mm, the sum of widths of the LG and RG regions ("$P_L+P_R$" in Expression 1) was approximately 545 μm, and the widths of the LG and RG regions were almost the same as each other. In the system, while widths ($H_1$ and $H_2$) of the TC1 and TC2 regions were controlled to ensure the maximum viewing angle ("$\theta_U$" or "$\theta_L$") of approximately 13.5 degrees in every embodiment. In each embodiment, the system was driven with changing the widths ($H_1$ and $H_2$) of the TC1 and TC2 regions as shown in Table 1. Relative brightness according to each viewing angle ("$\theta_U$" or "$\theta_L$") was measured using a brightness meter (SR-UL2 spectrometer), and the results are shown in Table 1.

TABLE 1

|  | Example | | | |
| --- | --- | --- | --- | --- |
|  | 4 | 5 | 6 | 7 |
| $H_1$ (unit: μm) | 210 | 180 | 150 | 120 |
| $H_2$ (unit: μm) | 30 | 60 | 90 | 120 |
| $H_1 + H_2$ (unit: μm) | 240 | 240 | 240 | 240 |
| Viewing Angle (unit: degree) | Relative Brightness (unit: %) | | | |
| 0 | 61.1 | 66.7 | 72.5 | 78 |
| 2 | 61.1 | 66.7 | 72.5 | 74.8 |
| 4 | 61.1 | 66.7 | 69.3 | 71.6 |
| 6 | 61.1 | 66.7 | 66.1 | 68.4 |
| 8 | 61.1 | 65 | 62.9 | 65.2 |
| 10 | 61.1 | 62.2 | 62 | 61.9 |
| 12 | 58.3 | 59 | 58.8 | 58.7 |
| 13 | 56 | 56 | 56 | 56 |

Comparative Example 1

Systems were designed as described in Examples 4 to 7. An optical filter was manufactured by the method described in Example 1, but did not go through a printing process for forming a TC region. That is, an optical filter not including a TC2 region was used. Like in the Examples, the system was configured by controlling the width (H1) of a TC1 region to ensure the maximum viewing angle ("$\theta_U$" or "$\theta_L$") of approximately 13.5. With driving the system, relative brightness according to each viewing angle ("$\theta_U$" or "$\theta_L$") was measured using a brightness meter (SR-UL2 spectrometer), and the results are shown in Table 2.

TABLE 2

|  | Comparative Example 1 |
| --- | --- |
| $H_1$ (unit: μm) | 240 |
| $H_2$ (unit: μm) | 0 |
| $H_1 + H_2$ (unit: μm) | 240 |
| Viewing Angle (unit: degree) | Relative Brightness (unit: %) |
| 0 | 56 |
| 2 | 56 |
| 4 | 56 |
| 6 | 56 |
| 8 | 56 |
| 10 | 56 |
| 12 | 56 |
| 13 | 56 |

An illustrative optical filter may be applied to a 3D device so that the 3D device can display a 3D image at a wide viewing angle without loss of brightness.

What is claimed is:

1. An optical filter which is used to control a signal for a right eye and a signal for a left eye to have different polarized states from each other,
wherein the signals for the right eye and for the left eye are emitted from a stereoscopic image display device comprising a display part comprising signal generating regions for a right eye and a left eye configured to generate the signals for the right eye and left eye; and a first light transmission control region adjacent to the signal generating regions for the right eye and the left eye, and which comprises
a liquid crystal layer having first and second regions adjacent to each other which are capable of dividing incident light into at least two kinds of lights having different polarized states and emitting the divided lights; and
a second light transmission control region in the boundary between the first and second regions,
wherein the second light transmission control region is formed so that the maximum value of an angle "$\theta_U$" satisfying Expression 2 and the maximum value of an angle "$\theta_L$" satisfying Expression 3 are three degrees or more,
wherein the stereoscopic image display device to which the optical filter is applied has a relative brightness of 60% or more when observed from front,
wherein the relative brightness refer to a ratio of brightness $I_T$ of the stereoscopic image display device having the first light transmission control region and the second light transmission control region formed with respect to brightness $I_O$ of a stereoscopic image display device having neither the first light transmission control region nor the second light transmission control region:

$$\tan \theta_U = (H_1 + 2y)/2T \quad \text{[Expression 2]}$$

$$\tan \theta_L = (H_1 + 2H_2 - 2y)/2T \quad \text{[Expression 3]}$$

where $H_1$ is the width of the first light transmission control region of the stereoscopic image display device, $H_2$ is the width of the second light transmission control region of the optical filter, T is the distance from the display part to the optical filter in the device to which the optical filter is applied, and y is the distance from a point at which an imaginary normal line bisecting the first light transmission control region meets the second light transmission control region, to an end point of the second light transmission control region, in a lateral view of the stereoscopic image display device, wherein the optical filter further comprises a base layer, the liquid crystal layer is formed on the base layer, at least a part of the liquid crystal layer is contacted with the base layer, and the second light transmission control region is between the base layer and the liquid crystal layer, or on the liquid crystal layer's surface, opposite to the surface on which the base layer is formed, and wherein $H_2$ is in a range of more than 0 to 1000 μm and $H_2$ is same as or smaller than $H_1$.

2. The optical filter according to claim 1, wherein the liquid crystal layer comprises a multifunctional polymerizable liquid crystal compound and a monofunctional polymerizable liquid crystal compound.

3. The optical filter according to claim 1, wherein a difference between an in-plane refractive index of a slow axis direction of the liquid crystal layer and an in-plane refractive index of a fast axis direction of the liquid crystal layer is in the range from 0.05 to 0.2 and the liquid crystal layer has a thickness in the range from 0.5 to 2.0 μm.

4. The optical filter according to claim 1, wherein the light transmission control region has a light transmission rate in the range from 0% to 20%.

5. The optical filter according to claim 1, wherein the first and second regions are phase retardation regions having optical axes formed in different directions to each other, and the light transmission control region is formed parallel to a line bisecting an angle formed by the optical axes in the first and second regions, or formed on the line bisecting the angle.

6. The optical filter according to claim 1, wherein the light transmission control region comprises a light blocking or absorbing ink.

7. The optical filter according to claim 1, further comprising:
an alignment layer between the base layer and the liquid crystal layer.

8. The optical filter according to claim 7, wherein the light transmission control region is between the alignment layer and the liquid crystal layer.

9. The optical filter according to claim 7, wherein the light transmission control region is between the alignment layer and the base layer.

10. A stereoscopic image display device, comprising:
a display part comprising signal generating regions for right and left eyes capable of generating signals for right and left eyes, and a first light transmission control region adjacent to the signal generating regions for right and left eyes; and
the optical filter of claim 1, which is positioned such that one of the first and second regions is at a location to which the signal for the right eye is incident and the other of the first and second regions is at a location to which the signal for the left eye is incident.

11. A method of manufacturing an optical filter which is used to control a signal for a right eye and a signal for a left eye to have different polarized states from each other, wherein the signals for the right eye and for the left eye are emitted from a stereoscopic image display device comprising a display part comprising signal generating regions for a right eye and a left eye configured to generate the signals for the right eye and left eye; and a first light transmission control region adjacent to the signal generating regions for the right eye and the left eye and which comprises, comprising:

forming a second light transmission control region on the boundary between first and second regions in a liquid crystal layer comprising the first and second regions which have different phase retardation characteristics and which are adjacent to each other, wherein the second light transmission control region is formed so that the maximum value of an angle "$\theta_U$" satisfying Expression 2 and the maximum value of an angle "$\theta_L$" satisfying Expression 3 are three degrees or more, wherein the stereoscopic image display device to which the optical filter is applied has a relative brightness of 60% or more when observed from front, and wherein the relative brightness refer to a ratio of brightness $I_T$ of the stereoscopic image display device having the first light transmission control region and the second light transmission control region formed with respect to brightness $I_O$ of a stereoscopic image display device having neither the first light transmission control region nor the second light transmission control region:

$$\tan \theta_U = (H_1 + 2y)/2T \quad \text{[Expression 2]}$$

$$\tan \theta_L = (H_1 + 2H_2 - 2y)/2T \quad \text{[Expression 3]}$$

where $H_1$ is the width of the first light transmission control region of the stereoscopic image display device, $H_2$ is the width of the second light transmission control region, T is the distance from the display part to the optical filter in the device to which the optical filter is applied, and y is the distance from a point at which an imaginary normal line bisecting the first light transmission control region meets the second light transmission control region, to an end point of the second light transmission control region, in a lateral view of the stereoscopic image display device, wherein the optical filter further comprises a base layer, the liquid crystal layer is formed on the base layer, at least a part of the liquid crystal layer is contacted with the base layer, and the second light transmission control region is between the base layer and the liquid crystal layer, or on the liquid crystal layer's surface, opposite to the surface on which the base layer is formed, and wherein $H_2$ is in a range of more than 0 to 1000 μm and $H_2$ is same as or smaller than H1.

12. The method according to claim 11, wherein the liquid crystal layer is formed by forming an alignment layer on a base layer, forming a coating layer of a liquid crystal composition comprising a polymerizable liquid crystal compound on the alignment layer, and polymerizing the liquid crystal composition in an aligned state.

13. The method according to claim 12, wherein the light transmission control region is formed by printing light blocking or absorbing ink.

14. The method according to claim 13, wherein the light blocking or absorbing ink is printed on a surface of the base layer, the alignment layer or the liquid crystal layer.

15. The method according to claim 13, wherein the light blocking or absorbing ink is printed on a surface of the alignment layer before the liquid crystal layer is formed.

* * * * *